Nov. 1, 1960  F. W. RIDDLE ET AL  2,958,343
FLOAT CUTTING APPARATUS FOR LOOMS
Filed Nov. 12, 1957  5 Sheets-Sheet 1

INVENTORS:
FRANK W. RIDDLE and
SIMEON LESTER DUFFETT
BY Eaton, Bell, Hunt & Seltzer
ATTORNEYS

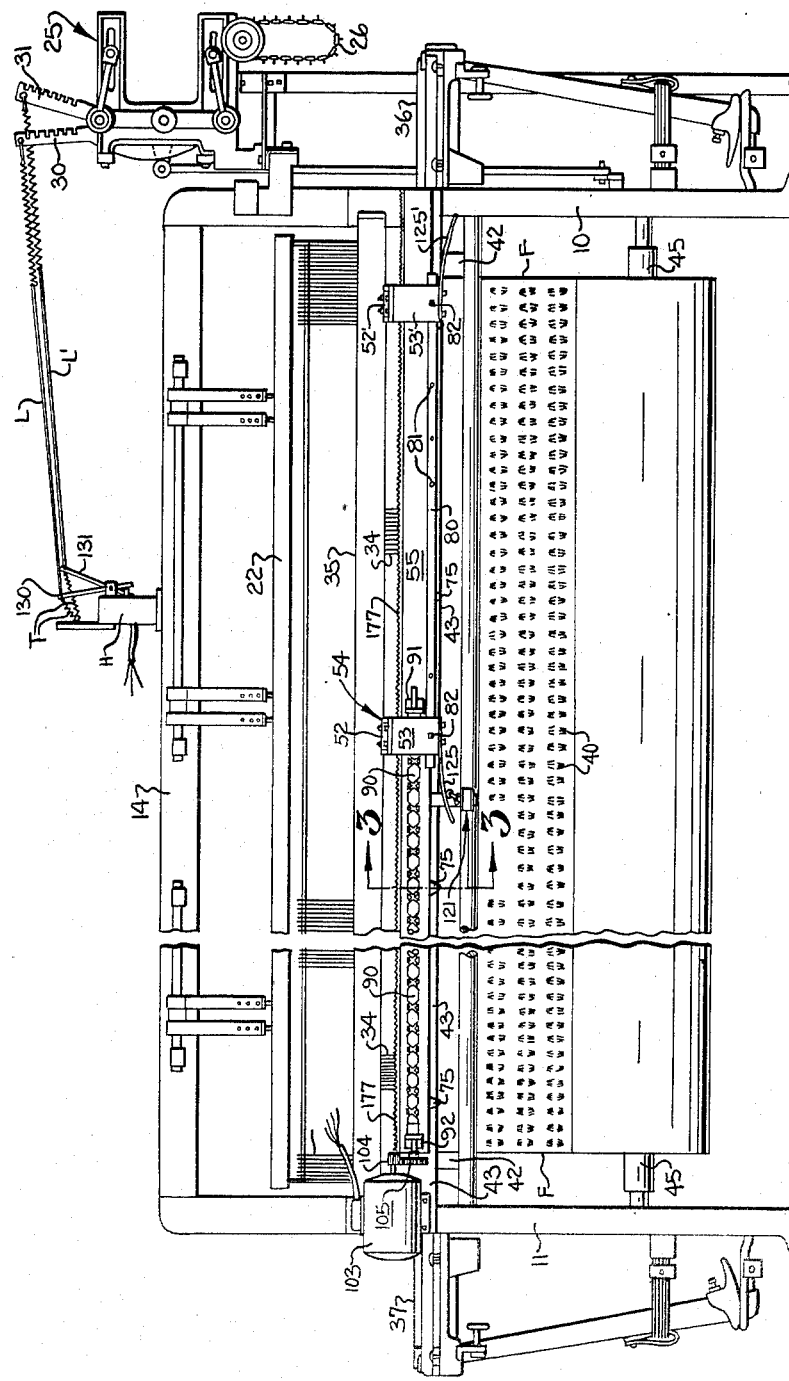

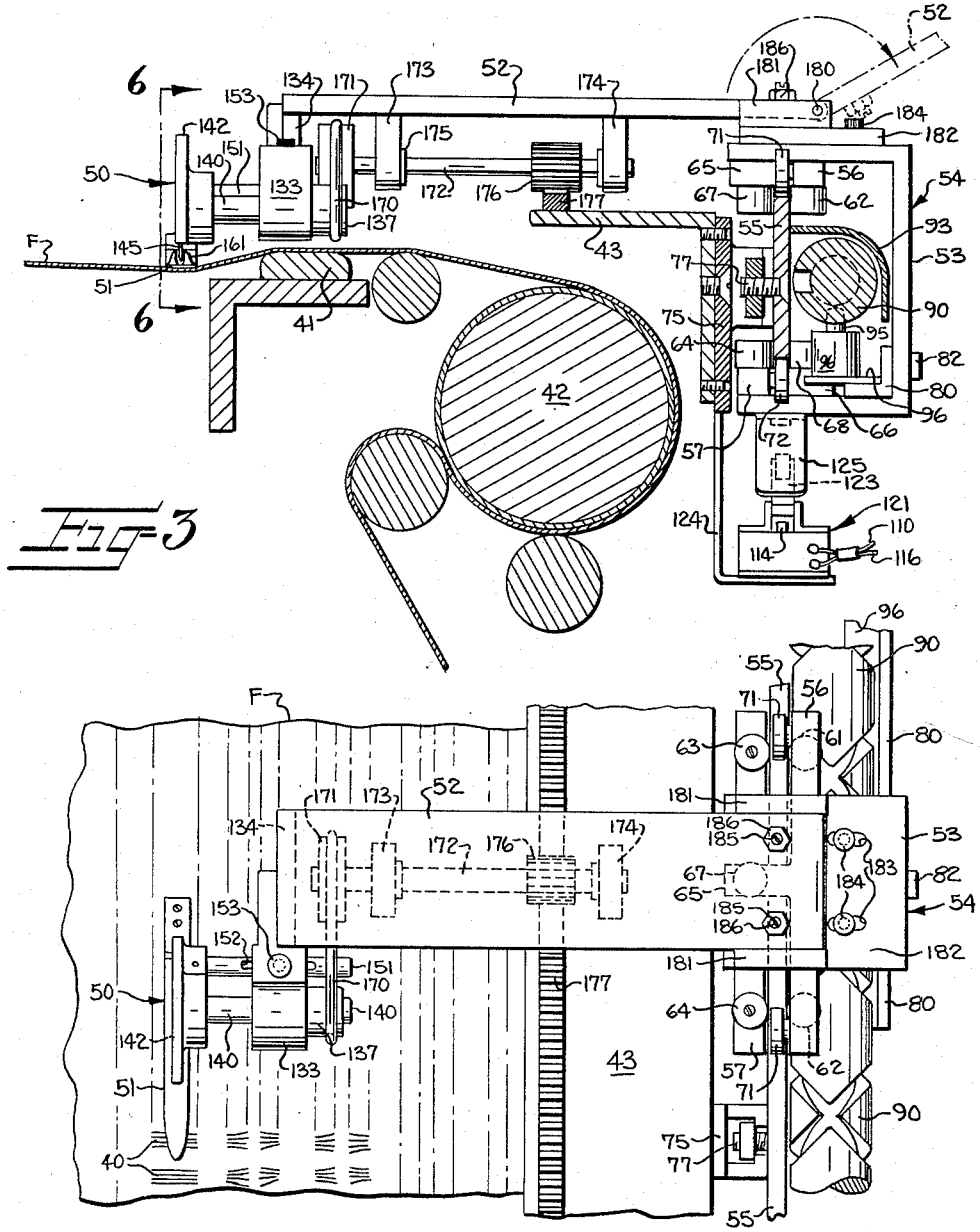

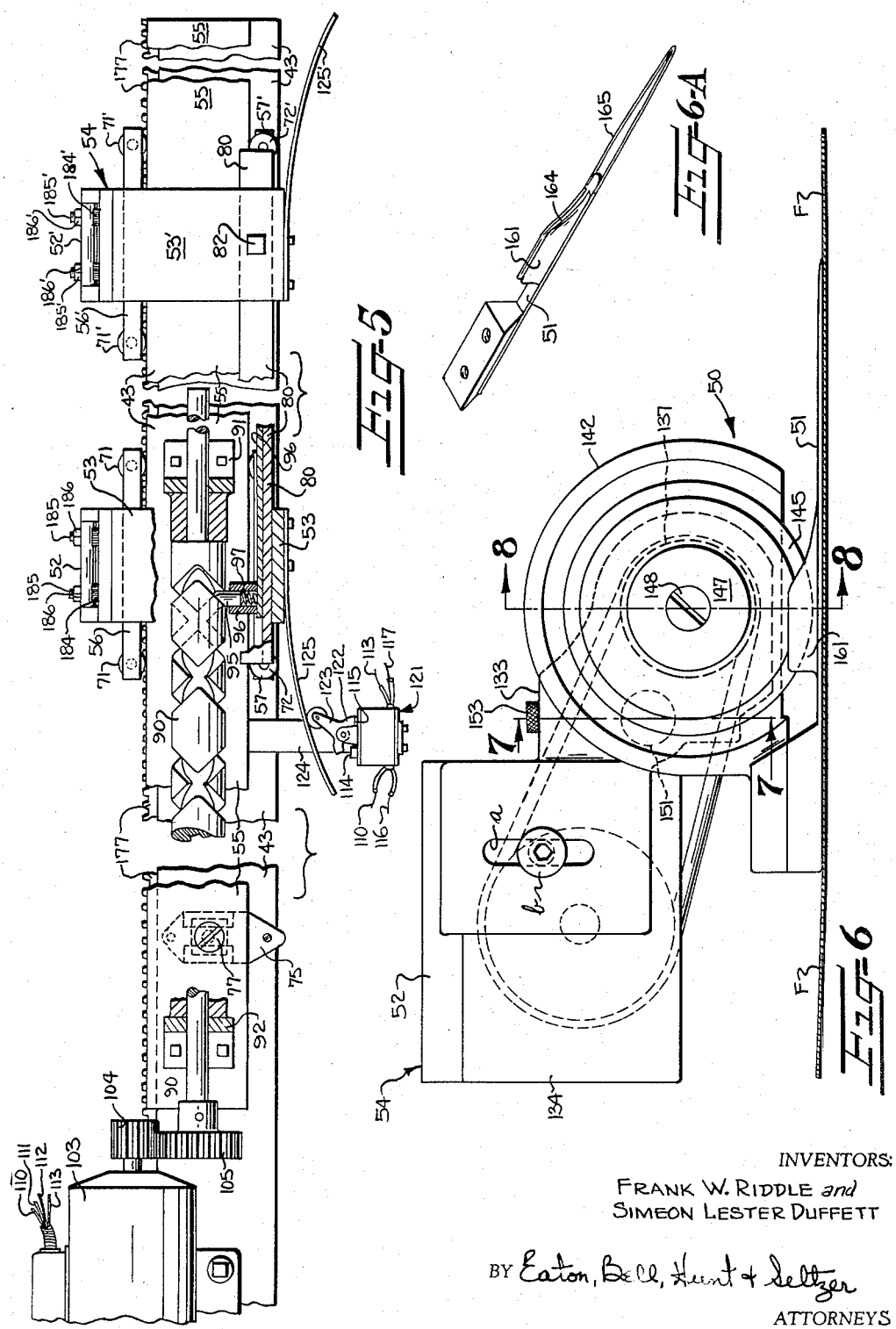

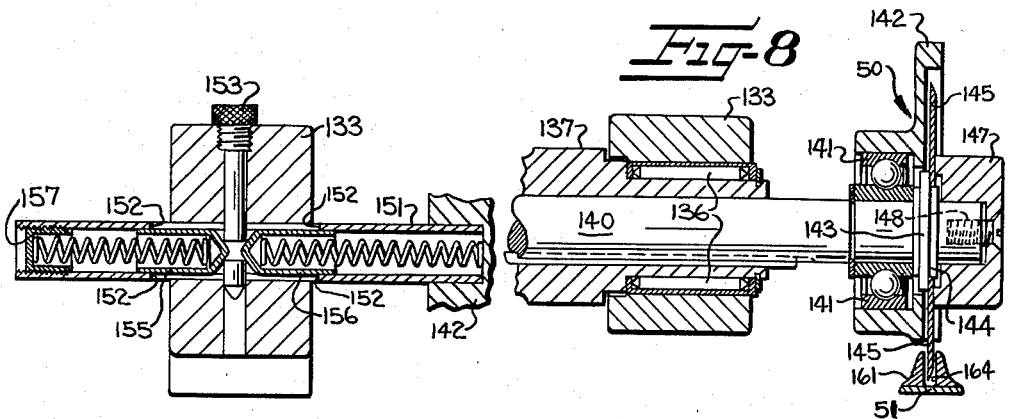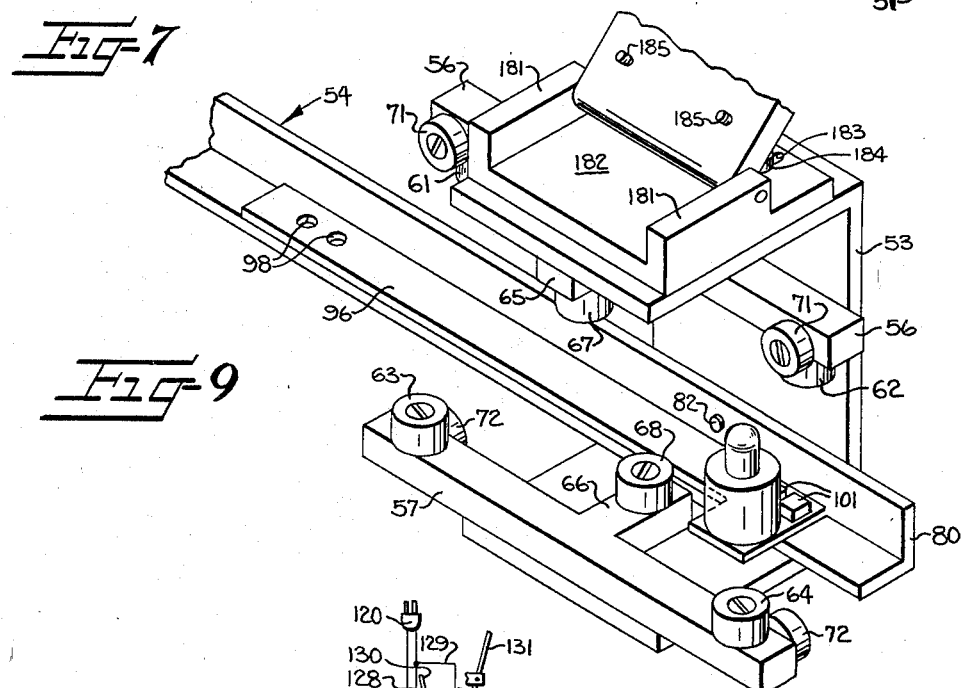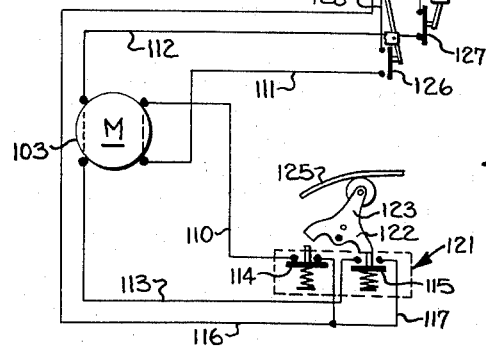

United States Patent Office 2,958,343
Patented Nov. 1, 1960

2,958,343

FLOAT CUTTING APPARATUS FOR LOOMS

Frank W. Riddle, Biscoe, and Simeon Lester Duffett, Laurinburg, N.C., assignors to Scotland Mills, Inc., Laurinburg, N.C., a corporation of North Carolina Filed Nov. 12, 1957, Ser. No. 695,754

14 Claims. (Cl. 139—291)

This invention relates to apparatus for cutting floats on woven fabrics in the production of tufted woven fabrics, which apparatus is particularly adapted for use on a loom.

As is well known, in the manufacture of tufted woven fabric, successive alternate or spaced portions of either the warp or filler yarns are floated for considerable distances or relatively short distances on the surfaces of the fabric. The yarns which are floated in this manner are frequently termed as tuft cords. Either during or after the weaving of the fabric, the floats or tuft cords are severed and then brushed or finished in the desired manner to produce the desired tufted effect.

Various attempts have been made to automatically sever the floats on a loom while the fabric is being woven. While known prior mechanisms have served the primary purpose of severing the floats with movement of the float cutting apparatus transversely and in timed relation to the operation of the loom, such devices have not been entirely satisfactory due to the fact that the floats had to be relatively long in order to insure movement of the cutting apparatus throughout the width of relatively broad fabric in cutting transverse rows of floats without tearing the fabric or the floats, particularly in instances in which the floats were spaced apart further than the length of the float-engaging plows. Also, prior float cutting mechanisms have consisted of many parts and were, therefore, expensive to manufacture and maintain. In addition, such devices have been so constructed as to obstruct the fabric between the lay and the front of the loom to such extent as to hinder the operator in the piecing of broken ends and in carrying out various other operations necessary to maintaining the operation of the loom.

Some of the objects of this invention are to provide an improved float cutting apparatus for looms which obviates the above mentioned and other defects; that is, the present float cutting apparatus is so constructed as to complete the severing of transverse rows of floats in a relatively short interval of time, through utilization of multiple weft-wise spaced cutter heads and respective plows, and which cutting apparatus includes a minimum of parts which are simply constructed and assembled. Also, each cutter head is so mounted as to be adjusted forwardly and rearwardly as well as upwardly and downwardly relative to the direction of movement of the fabric on the loom, and each of such cutter heads is pivotally supported to facilitate ease in tilting the same upwardly and forwardly away from the fabric so the fabric in front of the lay is unobstructed.

It is another object of this invention to provide novel means for reciprocating the carriage of the float cutting apparatus and controlling the length of stroke of the carriage, comprising a pattern controlled, intermittently driven, reversely threaded shaft carried by the loom, the shaft being engaged by a follower adjustably carried by the carriage.

Some of the objects of the invention having been stated, other objects will appear as the description proceeds when taken in connection with the accompanying drawings, in which—

Figure 2 is a front elevation of the loom shown in Figure 1 and also showing the improved float cutting apparatus in association therewith;

Figure 3 is an enlarged side elevation of the improved float cutting apparatus showing portions of the loom and the driving means for the apparatus in cross-section and being taken substantially along line 3—3 in Figure 2;

Figure 4 is a top plan view of one of the improved cutter heads looking down on Figure 3, with parts broken away;

Figure 5 is a front elevation, partially in section and with parts broken away, taken substantially along line 5—5 in Figure 1 and showing the trackway traversed by the float cutting apparatus and the means for driving said apparatus;

Figure 6 is an enlarged elevation of one of the cutter heads looking at the left-hand side of Figure 3 substantially along line 6—6;

Figure 1:
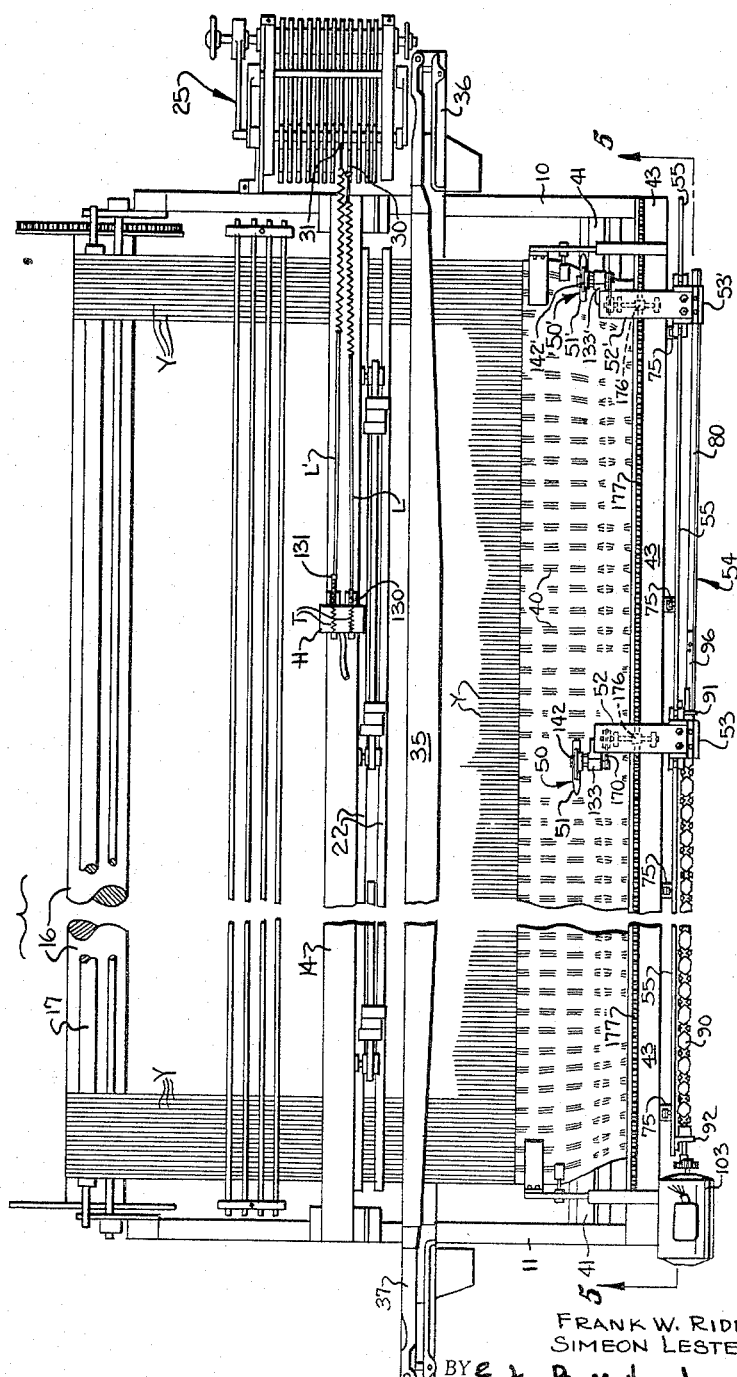
Figure 1 is a top plan view of a loom with parts broken away and showing only those parts pertinent to the present invention, wherein the floats are woven in the fabric with the warp yarns, and showing the present invention in association therewith.

Figure 6-A is an isometric view of the plow removed from the cutter head of Figure 6 and having a wire nose extension thereon;

Figure 7 is a fragmentary vertical sectional view taken substantially along line 7—7 in Figure 6;

Figure 8 is a fragmentary vertical sectional view taken substantially along line 8—8 in Figure 6;

Figure 9 is an isometric view looking at the inside of one of the carriage brackets and showing how the bracket is supported for movement along the trackway, but omitting the trackway;

Figure 10 is a schematic wiring diagram of the circuit for controlling operation of the improved float cutting apparatus and showing how it is actuated by the loom pattern mechanism.

Referring more specifically to the drawings, the present invention is shown in association with a loom of the usual type provided with a dobby head which embodies the usual pattern mechanism for controlling the harnesses. This pattern mechanism also controls operation of the motor associated with the float cutting apparatus as it starts to traverse the width of the woven fabric. Although the dobby head embodies a pattern mechanism, it is to be distinctly understood that any type of means may be employed to effect each cycle in the operation of the improved float cutting apparatus at predetermined intervals, which intervals are, of course, determined by the length of the warpwise extending floats.

The loom shown in Figures 1 and 2 has the usual right-hand and left-hand side frame members 10 and 11, respectively, which are spanned at their front medial portions by a girt or breast beam 43. The upper ends of the side frame members 10 and 11 are connected together by an arch 14. Warp yarns, generally designated at Y, are taken from the usual warp beam 16 disposed at the rear of the loom and pass over a whip roll 17 (Figure 1) and then extend forwardly through the usual harnesses 22 mounted in the usual manner and, in the present instance, the harnesses may be controlled by a conventional dobby head mechanism broadly designated at 25 in Figures 1 and 2. The dobby head mechanism is mounted in a conventional manner at the right-hand end of the arch 14 of the loom in Figures 1 and 2.

The dobby head is of the usual type having a pattern chain 26 which controls the operation of conventional dobby jacks, only two of which are utilized in the operation of the present apparatus and which two dobby jacks are indicated at 30 and 31, respectively.

After the yarns Y have passed through the harnesses, they pass through the usual reed 34 carried by a lay 35. The lay 35 has shuttle boxes 36 and 37 at opposite ends thereof for alternately receiving the shuttle, not shown, for drawing a filling through the shed formed of the warp by the harnesses 22 and whereby, upon each beat-up stroke of the lay 35 a pick will be cast to weave a sheet of fabric F. At least one of the harnesses 22 is controlled in a conventional manner so as to cause the same to remain in elevated position for predetermined intervals so that certain of the warp yarns Y are floated to form floats or floated yarn portions 40 at spaced points along the width of the fabric F (Figure 1). The floats 40 may also be termed as tuft cords.

As best shown in Figure 3, the fabric F extends forwardly from the beat-up point of the reed 34 and preferably passes over a rigid support 41 in its course to a take-up or sand roll 42. The sand roll 42 is conventional and is driven in a conventional manner to maintain the fabric F under tension. Accordingly, a further description thereof is deemed unnecessary. The sand roll is disposed rearwardly of and beneath a transverse bar 43 which is shown in the form of an angle bar and which bar serves as a breast beam or may be used in the event that the loom is not provided with a breast beam. Of course, the transverse bar 43 is suitably secured, at opposite ends thereof, to the side frame members 10 and 11. The fabric F then extends downwardly from the sand roll 42 and is taken up on a conventional take-up roll 45, as is usual. Other parts of the loom are shown in Figures 1 and 2, but these need not be described, since they are conventional.

The improved float cutting apparatus comprises a plurality of cutter heads which are spaced in substantially alined relationship along the width of the loom. In this instance, two such cutter heads are shown in Figures 1 and 2 broadly designated at 50 and 50'. The cutter heads 50, 50' are generally of the type disclosed in U.S. Patent No. 2,685,309, issued to Harold E. Schaller on August 3, 1954. The cutter heads 50, 50' have respective plows 51, 51' (Figures 1, 3, 4, 6 and 8) thereon which preferably engage the fabric F adjacent the rigid support 41. The parts associated with the cutter head 50' are substantially the same as parts associated with the cutter head 50 and, therefore, only the parts associated with the cutter head 50 will be described in detail and like parts associated with the cutter head 50' will bear the same reference characters with the prime notation added. Differences in such associated parts will be pointed up later in this context.

The cutter head 50 is carried by a swing arm 52 which normally occupies substantially horizontal position as shown in Figures 3 and 4. The arm 52 extends rearwardly or to the right in Figures 3 and 4 and is mounted for vertical and horizontal adjustment on a substantially C-shaped carriage bracket 53, the carriage brackets 53, 53' being parts of a carriage broadly designated at 54. The carriage brackets 53, 53' are guided for substantially horizontal movement transversely of the loom and parallel to the breast beam 43 on a common plate-like trackway 55 suitably supported on the breast beam 43.

Each of the carriage brackets 53, 53' is guided and supported for horizontal movement on the trackway 55 by means of a plurality of rollers which will now be described (Figure 9). The upper flange of the substantially C-shaped carriage bracket 53 has an elongated bar 56 fixed thereto, a corresponding bar 57 being fixed to the upper surface of the lower flange of the carriage bracket 53. The opposite end portions of the bars 56, 57 have respective pairs of spaced guide rollers 61, 62 and 63, 64 journaled thereon for rotation about respective substantially vertical axes. The upper pair of rollers 61, 62 engage the outer surface of the trackway 55 adjacent its upper edge and the bottom pair of rollers 63, 64 engage the inner or rear surface of the trackway 55 adjacent its lower edge.

The bars 56, 57 have respective outwardly and oppositely projecting medial portions 65, 66 thereon which extend past the respective upper and lower edges of the trackway 55 and have respective guide rollers 67, 68 journaled thereon for engaging the respective upper and lower portions of the trackway 55 at its respective rear and front surfaces. The opposite end portions of the upper and lower bars 56, 57 also have respective pairs of rollers 71, 72 journaled thereon for engaging the respective upper and lower edges of the trackway 55. It is thus seen that the rollers 61–64, 67 and 68 maintain the stability of the carriage bracket 53 during movement thereof along trackway 55 while the rollers 71, 72 support the carriage bracket 53 and also assist in maintaining the carriage bracket 53 stable during its movement along the trackway 55.

The trackway 55 is adjustably secured to the front surface of the breast beam 43 by means of horizontally spaced support brackets 75. The brackets 75 are suitably secured to the front surface of the breast beam 43 and slotted outer portions of the brackets 75 are each penetrated by a bolt 77 for adjustably securing the trackway to the corresponding bracket 75. The brackets 53, 53' of the carriage 54 are interconnected by means of a rigid frame member 80 which is shown in the form of a relatively small angle bar in Figures 3, 4 and 9. The vertical flange of the angle bar 80 is preferably provided with a plurality of threaded holes 81 therein into certain of which screws 82, penetrating the web portions of the brackets 53, 53', may be threaded, thereby facilitating relative adjustment of the carriage brackets 53, 53' to accommodate fabrics of varying widths as will be hereinafter described.

Novel means are provided for imparting reciprocatory movement to the carriage 54 at predetermined intervals corresponding to the number of picks involved in the forming of each transverse row of floats 40 and the fabric between such floats. Referring to Figures 1 through 5, there will be observed a reversely threaded worm shaft 90 which may extend throughout the width of the loom, but preferably extends from adjacent one side of the loom to a point substantially midway of the longitudinal center of the loom. The worm shaft 90 has reduced opposite ends journaled in bearing blocks 91, 92 suitably secured to the front surface of the trackway 55. The worm shaft 90 is so located and of such diameter that the web portions of the carriage brackets 53, 53' pass outwardly of the same during reciprocation of the carriage 54 and, as shown in Figures 3, 4 and 9, the flanges of the carriage brackets 53, 53' then straddle the worm shaft 90. The worm shaft 90 is preferably provided with a suitable shield or cover 93 as shown in Figure 3 which cover may be suitably secured to the trackway 55. The shield 93 is omitted in other views for purposes of clarity.

The reversely spiralled groove in the worm shaft 90 is engaged by a spring-loaded follower 95 (Figures 5 and 9) which is guided for vertical movement in the enlarged end of an elongated bracket 96 and is normally urged into engagement with the groove in the worm shaft 90 by a compression spring 97. The bracket 96 is mounted for longitudinal adjustment, substantially parallel to the axis of the worm shaft 90, on the carriage 54. To this end, it will be observed in Figure 9 that the elongated bracket 96 is provided with a plurality of holes 98 therein through various ones of which screws 101 may extend for securing bracket 96 in the desired adjusted position.

It will be observed in Figures 1, 2 and 5 that driving connections are provided between one end of the worm shaft 90 and an electric motor 103 suitably supported on the breast beam or the left-hand side frame member 11. In this instance, the driving connections between the worm shaft 90 and the electric motor 103 are shown in the form of intermeshing gears 104, 105 which are mounted on respective corresponding ends of the worm shaft 90 and the shaft of the motor 103.

Referring to Figure 10 it will be observed that the electric motor has four conductors or wires 110–113 extending therefrom. The wires 110, 113 are connected to corresponding sides of motor 103 and lead to corresponding sides of respective switches 114, 115, to the other sides of which conductors 116, 117 are connected. The end of conductor 117 remote from switch 115 is connected to conductor 116 and the conductor 116 is connected to one side of a suitable source of electrical energy as indicated by a plug 120. The switches 114, 115 are parts of a common switch assembly 121 and are normally closed. The switches 114, 115 are alternately opened by a pivoted bar 122 having an actuating arm 123 extending upwardly therefrom as best shown in Figure 2.

Since the switches 114, 115 are normally closed, it is apparent that they are normally biased upwardly in Figure 10 and thus normally maintain the actuating arm 123 in a vertical position. The switch assembly 121 is suitably secured to an L-shaped support 124 (Figures 2 and 3) whose vertical leg extends upwardly and is suitably adjustably secured to the breast beam 43. The carriage brackets 53, 53' have respective cam elements 125, 125' suitably secured to the lower portions thereof and which extend oppositely from the respective carriage brackets 53, 53' as best shown in Figure 5.

The cam elements 125, 125' are shown in the form of curved plates in Figure 5, which alternately engage and impart movement to the switch actuating arm or lever 123, depending upon the direction in which the carriage 54 is moving. In other words, as the carriage moves from left to right in Figure 5, the cam element 125 engages the switch actuating arm to move the same in a clockwise direction which will open the switch 115 (Figures 5 and 10) while permitting the switch 114 to remain closed. On the other hand, as the carriage 54 moves from right to left in Figure 5, movement of the cam 125 out of engagement with the switch actuating arm 123 permits both switches 114, 115 to close; moving actuating arm 123 to upright position, and the cam element 125' then engages and moves the switch 114 while permitting the switch 115 to remain closed.

The switch assembly 121 merely serves as a safety switch to insure that the circuit to the electric motor 103 is broken at the proper time so the carriage 54 stops at the corresponding end of its range of movement or approximately so.

Referring again to Figure 10, it will be observed that the conductors 111, 112 are connected to corresponding sides of respectively normally open switches 126, 127, to the other sides of which conductors 128, 129 are connected. The conductors 128, 129 are interconnected and conductor 128 leads to the other side of the plug 120.

The switches 126, 127, preferably of the push-button type, are adapted to be engaged and depressed to closed position by respective levers 130, 131 pivotally mounted on a housing H suitably secured to the arch 14 of the loom and in which housing H the two switches 126, 127 are suitably mounted. Each of the levers 130, 131 is normally urged to inoperative position by a tension spring T. The levers 130, 131 have respective stretchable links L, L' connected thereto and extending outwardly therefrom and being connected to the respective dobby jacks 30, 31.

As heretofore stated the dobby jacks 30, 31 are controlled by the pattern chain 26, and it is apparent, therefore, that upon a predetermined number of picks of the loom, the dobby jack 30, for example, is moved from left to right in Figure 2 to close the switch 126. Assuming that the carriage 54 then occupies the position shown in Figures 1, 2 and 5, it is apparent that the switch 114 is then closed while the switch 115 is open so the circuit is completed to the electric motor 103 from the source of current 120, through conductors 129, 128, through the switch 126, through conductor 111, motor 103, conductor 110, switch 114 and conductor 116 to the other side of the source of current 120. Of course, when the motor is energized, this imparts rotation to the worm shaft 90 to initiate a cycle in the movement of the carriage 54.

As the cam element 125 moves out of engagement with the actuating element 123 of the switch assembly 121, the actuating element 123 returns to vertical position and both of the switches 114, 115 are then closed. However, as the cam element 125' moves into engagement with the switch actuating element 123, this moves the switch actuating element 123 in a counterclockwise direction in Figure 5 to thereby open the switch 114 while the switch 115 remains closed, thereby breaking the circuit to the electric motor until such time as the other dobby jack 31 is actuated in the manner heretofore described to close the switch 127. It is apparent that the switch 127 functions in a manner similar to switch 126 and a further description thereof is deemed unnecessary. It is further apparent that the switch assembly 121 could be omitted. However, the action of the dobby jacks 30 and 31 to release the respective switches 126, 127 would then have to be quite accurate in order to insure stoppage of the carriage 54 at the proper place at the end of each stroke in each direction thereof.

*Description of cutter head assemblies*

As heretofore stated, since the cutter head assemblies 50, 50' are substantially identical, both cutter head assemblies shall bear the same reference characters with the prime notation being added to those reference characters associated with the cutter head assembly 50'.

Referring to Figures 3, 4, 6, 7 and 8, the cutter head assembly 50 comprises a block-like cutter head support 133 which is suitably secured to and depends from the free end of the corresponding arm 52. To this end, the cutter head support 133 has a vertically extending slot *a* in one side portion thereof which is penetrated by a screw *b* for securing the cutter head support 133 to a downwardly projecting member 134 formed integral with or suitably secured to the free end of the arm 52. It might be stated here that the cutter head support 133 is preferably made opposite hand to the cutter head support 133'.

A thickened outer portion of the cutter head support 133 has a bearing member, preferably a needle bearing 136 (Figure 8), fixed therein which is slidably penetrated by a reduced hub portion of a pulley 137. The pulley 137 is suitably restrained from axial movement. Thus, the pulley 137 is journaled in the support 133. A quill shaft 140 is keyed for axial movement in the pulley 137 and its outer or rear end portion has an antifriction bearing 141 mounted thereon, on the outer race of which a cutter head block 142 is mounted.

The quill shaft 140 has an enlarged annular portion 143 fixed thereon or integral therewith which is, in turn, provided with an outwardly projecting relatively thin annular shoulder 144 thereon onto which a rotary cutting disc 145 is fitted. Depending upon the character of the floats to be severed, a plurality of the cutter head blocks and corresponding cutters may be provided on the outer end of the quill shaft 140 for simultaneously cutting the floats in more than one transverse row. However, in the present instance, the quill shaft 140 has a single rotary cutting blade or disk 145 mounted thereon which is held against the seat formed by the enlarged annular portion 143 of shaft 140 by means of a cup-like member 147 whose outer portion is penetrated by a screw 148 for securing the cup-like member 147 to the corresponding end of the quill shaft 140 and against the blade 145.

Disposed to one side of the quill shaft 140 is a tubular guide shaft 151 (Figure 7) which slidably penetrates the cutter head support block 133 and has a pair of diametrically opposed longitudinally extending slots 152 therein which are slidably penetrated by a vertically disposed locator pin 153 mounted for vertical sliding movement in the support block 133 and having its upper portion threaded into block 133. The upper end of the locator pin 153 preferably has a knurled handle portion thereon which may be grasped for removing and inserting the locator pin 153 with respect to the support block 133 and to thereby permit removal of the shafts 140 and 151 and the cutter head block 142.

It will be noted in Figure 7 that the portion of the locator pin 153 extending through the tubular guide shaft 151 is engaged at opposite sides thereof by spring-loaded detents 155, 156 mounted in the tubular shaft 151, one of the detents being adjustable by a screw 157. The detents 155, 156 are substantially the same as those associated with the cutter head in said U.S. Patent No. 2,685,309 and a further detailed description thereof is deemed unnecessary. The detents 155, 156 may also be termed as locator plungers, since the optimum position for the cutting disk 145 relative to the trackway 55 is determined by the position of the detents 155, 156, which detents provide means whereby the cutter head 50 may be moved automatically or manually either inwardly or outwardly with respect to the cutter head support 133 to accommodate any misalined floats in a transverse row on the fabric F and permit the fabric to be taken up during normal weaving relative to the carriage 54.

The cutter head blocks 142, 142' have respective oppositely directed float guiding plows, shoes or nose-like members 51, 51' suitably secured thereto. The body of each such plow is relatively thin and has a rounded nose or leading tip thereon so that it may readily pass between the floats and the base fabric F during movements of the apparatus transversely of the loom. Since the plow 51 is identical to the plow 51', only the plow 51 will be described further with like parts associated with the plow 51' where shown, bearing the same reference characters with the prime notation added.

A medial portion of the plow 51 has a raised portion 161 (Figures 3, 6, 6-A and 8) integral therewith having a longitudinally extending groove 164 (Figures 6-A and 8) therein of sufficient width to permit the corresponding peripheral portion of the rotary cutting disk to pass through the same without engaging either of the side walls of the groove 164. The leading end of this raised portion 161 is rounded so that, as the nose of the plow 51 passes beneath a float 40, the raised portion 161 raises the float and applies tension to the tuft cords thereof as they are engaged by the corresponding rotary cutting disk 145 to insure that the tuft cords are cleanly severed.

In Figure 6-A, the plow 51 is shown provided with a wire loop nose extension 165, which loop is substantially V-shaped and opposite end portions of which are suitably secured to opposite sides of the nose portion of the plow 51. This type of nose extension is desirable, since it provides an almost pointed nose for the plow 51 which is still sufficiently rounded at its free end so as to not dig into the fabric F and to insure that relatively short tuft cords are properly engaged by the plow 51 and thus severed by the rotary cutting blade 145.

In order to impart rotation to the cutting blade 145, it will be observed in Figures 3, 4 and 6 that the pulley 137, on the front end of the quill shaft 140, is engaged by an endless pliable element or belt 170 which also engages a pulley 171 fixed on a drive shaft 172. The drive shaft 172 extends forwardly and rearwardly and is journaled in bearing blocks 173, 174 suitably secured to and depending from the corresponding arm 52. Suitable enlarged portions or collars 175 are provided on the shaft 172 (Figures 3 and 4) to prevent axial movement of the shaft 172. The shaft 172 also has a pinion or gear 176 fixed thereon which engages a rack 177 suitably secured to the upper surface of the horizontal flange of the breast beam or angle bar 43.

The rack 177 extends longitudinally of the breast beam 43 and in substantially parallel relation to the trackway 55. Since the rack 177 is common to both of the cutter heads 50, 50', it preferably extends substantially throughout the width of the loom, or the length of the brest beam 43, and is, at least, of sufficient length so that both of the pinions 176, 176', remain in engagement with the rack 177 so as to insure constant rotation of the corresponding rotary cutting blades with reciprocation of the carriage 54.

Now, the arm 52, which carries cutter head assembly 50, is pivotally connected, as at 180 (Figure 3) between upstanding ears or projections 181 on an adjustable base 182. The adjustable base 182 is provided with forwardly and rearwardly extending adjustment slots 183 therein, each of which is penetrated by an adjustment screw 184 for adjustably securing the same to the upper flange of the corresponding carriage bracket 53. It is thus seen that the screws 184 may be loosened to facilitate manual, forward and rearward adjustment of the cutter head assemblies 50 relative to the loom and the fabric F being woven.

This is particularly desirable when it is considered that the cutter head assemblies 50 alternate in their cutting operations. That is, one of the cutter head assemblies moves from approximately the center of the loom outwardly to the corresponding cloth selvage, and then the other of the cutter head assemblies moves outwardly from the center of the loom in a cutting operation in the opposite direction. It is apparent, therefore, that the plow 51 or 51', as the case may be, of the particular cutter head assembly which is first moved toward the selvage in each instance should be spaced toward the fell of the cloth a slightly greater amount than the other of the cutter head assemblies so that, as the first active cutter head assembly completes a cutting operation, the other cutter head assembly will then be alined properly with the row of tuft cords 40 which extend transversely of the loom.

In order to insure that the plows of the two cutter head assemblies 50, 50' are accurately positioned so as to lightly bear upon the upper surface of the fabric F adjacent the bar 41 extending transversely of the loom, it will be observed in Figures 3, 4 and 9 that the pivot 180 of the arm 52 is spaced forwardly of the rear edge of the base 182 so the arm 52 actually overlies a portion of the base 182. This front portion of the bar or arm 52 is provided with means for adjustably limiting downward movement thereof relative to the carriage 54. To this end, it will be noted that a pair of adjustment screws or set screws 185 (Figures 4 and 9) threadably penetrates the front portion of the arm 52, and the lower ends of the screws 185 bear against the upper surface of the base 182, as is clearly apparent in Figures 3 and 4. Each of the screws 185 has a lock nut 186 thereon to maintain the screws 185 in the desired adjusted position.

In Figure 5, the follower 95 is shown in substantially the position occupied thereby at times when it is desired that strokes of maximum length be imparted to the carriage 54. It is apparent that such an arrangement is desirable in cutting floats on relatively wide fabrics. When a relatively narrow fabric is being woven, the range of the strokes of the carriage 54 should be correspondingly changed so the plows 51, 51' do not move outwardly beyond the selvages of the fabric. Accordingly, in order to accommodate such relatively narrow fabric, the elongated bracket 96 is then adjusted from right to left in Figure 5 (in this instance) a distance equal to one-half the difference between the width of the two fabrics concerned relative to the primary carriage bracket 53. In this way, the follower 95 may still traverse the entire length of the grooved portion of the worm shaft 90, since this merely causes the carriage bracket 53 to move further beyond the center of the loom relative to the cloth selvage with each inactive stroke (inward) thereof.

Since the carriage bracket 53 still moves the same distance in both instances and its range of movement only is changed by adjusting the follower carrying bracket 96, it is apparent that the right-hand or auxiliary carriage bracket 53' is adjusted toward the primary carriage bracket 53 on the bar 80 a distance substantially twice the distance to which the elongated bracket 96 was adjusted in the opposite direction relative to the primary carriage bracket 53. Relative positions of the cams 125, 125' should then remain the same and, to this end, the right-hand cam 125' is removed from the auxiliary carriage bracket 53' and secured to the bar 80. The switch bracket 124 is then adjusted to the right a distance substantially equal to that distance to which the follower-carrying bracket 96 was adjusted in the opposite direction relative to the primary carriage bracket 53.

Alternatively, since bracket 96 is secured to the bar 80, both of the carriage brackets 53, 53' may be adjusted equal distances toward each other relative to the bar 80, and the cams 125, 125' removed from the respective carriage brackets 53, 53' and secured in their original relative positions to the lower surface of the bar 80, which would also accommodate a relatively narrow fabric.

It is apparent that the number of cutter head assemblies extending from the carriage, the distance therebetween and the width of the fabric being woven determines the required length of the threads on the worm shaft 90. In other words, the worm shaft 90 need only extend from adjacent one edge of the fabric inwardly approximately one-fourth the width of the fabric in the event of four substantially equally spaced cutter heads being used.

It is thus seen that we have provided a novel float cutting apparatus having oppositely facing float raising devices or plows and which may move from adjacent the longitudinal center of the fabric F outwardly first in one direction and then in the other for relatively quickly cutting the corresponding floats, as compared to the intervals which would be required to effect the cutting of the floats in the event that a single cutting apparatus for used and had to traverse the full width of the fabric with each cycle thereof.

It is also seen that the novel apparatus consists of a relatively few parts, is simple to manufacture, maintain and adjust, it will accommodate fabrics of varying widths and a cutter head can readily be moved to inoperative position (Figure 9) so that the fabric in front of the lay of the loom is unobstructed.

In the drawings and specification there has been set forth a preferred embodiment of the invention, and, although specific terms are employed, they are used in a generic and descriptive sense only and not for purposes of limitation, the scope of the invention being defined in the claims.

We claim:
1. In a loom for weaving fabric and having means for floating warp yarns to form rows of spaced floats on the upper face of the fabric, an improved float cutting apparatus comprising a trackway disposed transversely of the loom, a carriage mounted for movement on the trackway, at least one arm pivotally mounted on, and normally resting on, said carriage, said arm normally overlying a portion of said fabric, a cutter head carried by the arm comprising a rotary cutting blade mounted on an axis substantially parallel to the warp yarns, means extending substantially radially from the rotary cutting blade for passing beneath the floats and directing the floats to the cutting blade with movement of the carriage, and means for reciprocating the carriage on the trackway, said pivoted arm facilitating swinging the cutter head away from the fabric to permit access to the fabric.

2. A structure according to claim 1 including means for adjustably limiting downward movement of the arm, and the cutter head, relative to the carriage.

3. A structure according to claim 1 wherein said arm is pivotally connected to the carriage by means of a base, and means for adjusting the base inwardly and outwardly relative to the fabric.

4. A structure according to claim 1 in which there is a shaft journaled beneath said arm and extending substantially parallel to the warp yarns, driving connections between the shaft and the blade, a pinion fixed on said shaft, and a stationary rack carried by the loom, extending beneath and parallel to the path of travel of said arm, and being engageable by said pinion for driving said blade.

5. In a loom having means for weaving fabric while forming spaced transverse rows of warpwise extending floats thereon, said loom also having a pattern mechanism thereon; in combination, a carriage mounted for movement transversely of and adjacent the path of travel of the fabric being woven, at least two transversely spaced cutter heads mounted on said carriage, each cutter head including a plow-like member for passing between the fabric and corresponding floats, a rotary cutting blade cooperating with each of said members for severing floats as they are engaged by said plow-like members, means for imparting reciprocatory movement to said carriage comprising a reversely threaded shaft mounted for rotation adjacent the carriage and extending in substantially parallel relation to the path of movement of the carriage, follower means carried by the carriage and engaging the grooves in said reversely threaded shaft, electrically operable means for driving said shaft, means under control of said pattern mechanism for energizing said electrically operable means, and means operable automatically as the carriages approaches the end of each stroke in each direction for deenergizing said electrically operable means independently of said pattern mechanism.

6. In a loom having means for weaving fabric with transverse rows of spaced warpwise extending floats thereon; the combination of a carriage mounted for transverse movement adjacent the fabric being woven, at least one arm extending from said carriage and overlying the fabric, a cutter head carried by said arm, said cutter head comprising a rotary cutting blade, means engageable with said floats for raising the same into engagement with said blade, means for reciprocating said carriage comprising a reversely threaded shaft, electrically operable means for driving said shaft, follower means carried by said carriage and engageable with the threads in said reversely threaded shaft, pattern controlled means for energizing said electrically operable means for imparting movement to said shaft and thus to the carriage, and means operable automatically upon the termination of each stroke of said carriage in each direction for deenergizing said electrically operable means.

7. A structure according to claim 6 wherein said means for deenergizing the electrically operable means comprises a pair of normally closed switches interposed in an electrical circuit to said electrically operable means, a pivoted actuating element disposed adjacent and between said switches and normally occupying a neutral position, and a pair of spaced cam elements movable with said carriage and being adapted to alternately engage and impart movement to said actuating element, movement of said actuating element in either direction causing a corresponding switch to open and deenergize said electrically operable means.

8. In a loom for weaving fabrics and having means for floating warp yarns to form transverse rows of floats on the upper face of the fabric, an improved float cutting apparatus comprising a trackway disposed transversely of the loom, a carriage mounted for movement on the trackway, a plurality of weftwise spaced arms pivotally mounted on said carriage and overlying the fabric, a cutter head carried by each arm and comprising a rotary cutting blade mounting on an axis substantially parallel to the warp yarns, means extending substantially radially from the rotary cutting blade for passing beneath the floats and directing the floats to each cutting blade with movement of the carriage, and means for reciprocating the carriage on the trackway, said pivoted arms facilitating swinging the respective cutter heads away from the fabric to permit access to the fabric.

9. A structure according to claim 8 including means for adjusting the displacement between adjacent cutter heads relative to the carriage.

10. A structure according to claim 8 including means for adjustably limiting downward movement of each arm, and its cutter head relative to the carriage.

11. A structure according to claim 8 wherein each of said arms is pivotally mounted on the carriage by means of a base, and means for adjusting the base inwardly and outwardly on said carriage and relative to the fabric.

12. In a loom for weaving fabric and having means for floating warp yarns to form rows of spaced floats on the upper face of the fabric, an improved float cutting apparatus comprising a trackway disposed transversely of the loom, a carriage mounted for movement on the trackway, at least one arm pivotally mounted on, and normally resting on, said carriage, said arm normally overlying a portion of said fabric, a cutter head carried by said arm comprising a cutting blade having its cutting edge disposed on a plane transverse to the warp yarns, means extending outwardly from the cutting blade transversely to the warp yarns for passing beneath the floats and directing the floats to the cutting blade with movement of said carriage, and means for reciprocating said carriage on the trackway, said pivoted arm facilitating swinging the cutter head away from the fabric to permit access to the fabric.

13. In a loom on which is woven a fabric having tuft cords lying substantially parallel to the fabric warp, said cords being woven in the fabric at spaced intervals in the length thereof to form floats alined in substantially transverse rows on the fabric; the combinaiton of a trackway disposed transversely of the loom, a carriage mounted for movement along said trackway, at least one float cutting device mounted on said carriage and having means for passing between said floats and said fabric, a cutting blade positioned adjacent the latter means for engaging and cutting said floats as they are raised by the latter means, means for imparting reciprocatory movement to said carriage comprising a reversely threaded shaft journaled on said loom and extending substantially parallel to said trackway, a follower element carried by said carriage and engaging the threads of said reversely threaded shaft, pattern controlled means for rotating said reversely threaded shaft at predeterminedly spaced intervals for predetermined lengths of time for imparting movement to the carriage in strokes corresponding substantially to the length of the threads on said reversely threaded shaft, and means for adjusting the follower element relative to the carriage in a direction substantially parallel to the axis of the reversely threaded shaft to thereby vary the range of movement imparted to the carriage.

14. In a loom on which is woven a fabric having tuft cords lying substantially parallel to the fabric warp, said cords being woven in the fabric at spaced intervals in the length thereof to form floats alined in substantially transverse rows on the fabric; the combination of a trackway disposed transversely of the loom, a carriage mounted for movement along said trackway, at least one float cutting device mounted on said carriage and having means for passing between said floats and said fabric, a cutting blade positioned adjacent the latter means for engaging and cutting said floats as they are raised by the latter means, means for imparting reciprocatory movement to said carriage comprising a reversely threaded shaft journaled on said loom and extending substantially parallel to said trackway, a follower element carried by said carriage and engaging the threads of said reversely threaded shaft, pattern controlled means for rotating said reversely threaded shaft at predeterminedly spaced intervals for predetermined lengths of time for imparting movement to the carriage in strokes corresponding substantially to the length of the threads on said reversely threaded shaft, means for adjusting the follower element relative to the carriage in a direction substantially parallel to the axis of the reversely threaded shaft to thereby vary the range of movement imparted to the carriage, at least one additional cutting device carried by said carriage and spaced transversely of the first-mentioned cutting device relative to the fabric, said additional cutting device also having means for passing between said floats and said fabric, a cutting blade adjacent the latter means for engaging and cutting respective floats as they are raised by the latter means, said means for raising the floats associated with one of the cutting devices being effective with movement of said one of the cutting devices outwardly toward one of the selvages of the fabric and the means for raising the floats associated with the other of the devices being effective to raise floats with movement of the other of the cutting devices outwardly toward the opposite selvage of the fabric, the length of strokes of the carriage being such as to cause said one of the cutting devices to move from a point adjacent the longitudinal center of the fabric outwardly toward one of the selvages, and the distance between the cutting devices being such that the other of the cutting devices then moves from a point adjacent the longitudinal center of the fabric outwardly toward the other selvage of the fabric whereby floats are cut throughout the width of the fabric with movement of the carriage a substantially lesser amount than that of the width of the fabric being woven.

References Cited in the file of this patent

UNITED STATES PATENTS

| | | |
|---|---|---|
| 2,192,410 | Moore et al. | Mar. 5, 1940 |
| 2,541,545 | Rickert et al. | Feb. 13, 1951 |
| 2,598,579 | McCutchen et al. | May 27, 1952 |
| 2,651,080 | Wied | Sept. 8, 1953 |
| 2,664,921 | Riddle | Jan. 5, 1954 |
| 2,685,309 | Schaller | Aug. 3, 1954 |